United States Patent
Verma et al.

(10) Patent No.: US 7,555,481 B1
(45) Date of Patent: Jun. 30, 2009

(54) METHOD AND APPARATUS FOR INCREASING TRANSACTION CONCURRENCY BY EARLY RELEASE OF LOCKS IN GROUPS

(75) Inventors: Sanjay Verma, Foster City, CA (US); Sibsankar Haldar, Madhyamgram (IN); Sherry Listgarten, Palo Alto, CA (US)

(73) Assignee: Oracle Corporation, Redwood Shores, CA (US)

( * ) Notice: Subject to any disclaimer, the term of this patent is extended or adjusted under 35 U.S.C. 154(b) by 368 days.

(21) Appl. No.: 10/696,416

(22) Filed: Oct. 28, 2003

(51) Int. Cl.
*G06F 17/30* (2006.01)

(52) U.S. Cl. .................. 707/8; 707/1; 707/7; 707/9; 707/200

(58) Field of Classification Search .............. 707/8, 707/9, 200, 1, 7
See application file for complete search history.

(56) References Cited

U.S. PATENT DOCUMENTS

| | | | |
|---|---|---|---|
| 4,627,019 A * | 12/1986 | Ng .................. | 707/8 |
| 4,875,159 A | 10/1989 | Cary et al. | |
| 5,170,480 A | 12/1992 | Mohan et al. | |
| 5,280,612 A | 1/1994 | Lorie et al. | |
| 5,287,496 A | 2/1994 | Chen et al. | |
| 5,287,521 A * | 2/1994 | Nitta et al. .......... | 710/200 |
| 5,313,629 A | 5/1994 | Abraham et al. | |
| 5,390,316 A | 2/1995 | Cramer et al. | |
| 5,410,697 A | 4/1995 | Baird et al. | |
| 5,423,037 A | 6/1995 | Hvasshovd | |
| 5,440,727 A | 8/1995 | Bhide et al. | |
| 5,452,445 A | 9/1995 | Hallmark et al. | |
| 5,485,607 A | 1/1996 | Lomet et al. | |
| 5,497,483 A * | 3/1996 | Beardsley et al. ....... | 714/1 |
| 5,555,404 A | 9/1996 | Torbjornsen et al. | |
| 5,577,240 A | 11/1996 | Demers et al. | |
| 5,586,310 A | 12/1996 | Sharman | |
| 5,621,795 A | 4/1997 | Baker et al. | |
| 5,701,480 A | 12/1997 | Raz | |
| 5,708,812 A | 1/1998 | Van Dyke et al. | |
| 5,737,601 A | 4/1998 | Jain et al. | |
| 5,745,747 A * | 4/1998 | Chang et al. .......... | 707/8 |

(Continued)

OTHER PUBLICATIONS

Mohan, C., "Aries/KVL: A Key-Value Locking Method for Concurrency Control of Multiaction Transactions Operating on B-Tree Indexes," Proceedings of 16th VLDB Conference, Brisbane, Australia, Aug. 1990, pp. 392-405.

(Continued)

*Primary Examiner*—Apu M Mofiz
*Assistant Examiner*—Monica M Pyo
(74) *Attorney, Agent, or Firm*—Stolowitz Ford Cowger LLP (57) ABSTRACT

Activity Duration Locking (ADL) provides an efficient simple solution to manage a potentially large number of concurrently active lock groups. The ADL scheme allows a transaction fine control over creation of lock groups and classification of locks into lock groups enabling faster releasing of locks in groups. The life time that the lock group is active defines a new lock duration. This allows a large number of lock durations to be defined with the creation of each new lock group and any number of lock durations can be active for a given transaction. A very general concept of lock duration is supported without using any a priori semantics to individual lock durations and the duration of a lock group may be determined by the transaction as desired.

12 Claims, 4 Drawing Sheets

U.S. PATENT DOCUMENTS

| | | | |
|---|---|---|---|
| 5,758,337 | A | 5/1998 | Hammond |
| 5,781,910 | A | 7/1998 | Gostanian et al. |
| 5,796,999 | A | 8/1998 | Azagury et al. |
| 5,806,075 | A | 9/1998 | Jain et al. |
| 5,809,503 | A | 9/1998 | Aoshima |
| 5,852,715 | A | 12/1998 | Raz et al. |
| 5,870,758 | A | 2/1999 | Bamford et al. |
| 5,923,833 | A | 7/1999 | Freund et al. |
| 5,974,427 | A | 10/1999 | Reiter |
| 6,009,425 | A | 12/1999 | Mohan |
| 6,122,645 | A | 9/2000 | Bohannon et al. |
| 6,233,585 | B1 | 5/2001 | Gupta et al. |
| 6,295,610 | B1 | 9/2001 | Ganesh et al. |
| 6,351,753 | B1 | 2/2002 | Jagadish et al. |
| 6,502,133 | B1 | 12/2002 | Baulier et al. |
| 6,631,478 | B1 | 10/2003 | Wang et al. |
| 6,647,510 | B1 | 11/2003 | Ganesh et al. |
| 2003/0078910 | A1 | 4/2003 | Kanai et al. |
| 2003/0200212 | A1 | 10/2003 | Benson et al. |
| 2004/0015642 | A1 | 1/2004 | Moir et al. |
| 2004/0139116 | A1 | 7/2004 | Porter |
| 2004/0205066 | A1* | 10/2004 | Bhattacharjee et al. ......... 707/8 |
| 2004/0220933 | A1* | 11/2004 | Walker ......................... 707/8 |
| 2004/0267747 | A1 | 12/2004 | Choi et al. |

OTHER PUBLICATIONS

Mohan, C.et al., "Aries/IM: An Efficient and High Concurrency Index Management Method Using Write-Ahead Logging," 1992 ACM SIGMOD, California, Jun. 1992, pp. 371-380.

Bernstein, P.A., et al., "Concurrency Control and Recovery in Database Systems; Multiversion Concurrency Control," Concurrency Control and Recovery in Database Systems, Addison-Wesley, pp. 143-166, 1987.

Anonymous, "Bonus C for Dummies Lesson 17-6—Sorting a Structure," Internet Article, Online! 2002, pp. 1-3. www.c-for-dummies.com/lessons/chapter.17/06. Retrieved on Dec. 21, 2004.

Mohan, C., et al., "Efficient and Flexible Methods for Transient Versioning of Records to Avoid Locking by Read-Only Transaction," Proceedings of the ACM SIGMOD International Conference on Management of Data, pp. 124-133, San Diego, Jun. 2-5, 1992.

Greenwald et al., "Oracle Essentials: Oracle 8 & Oracle 8i—Chapter 7, Multiuser Concurrency," Internet article, Online! Oct. 1999, pp. 1-7. www.cs.wisc.edu/{cs764-1/oracle.locking.html. Retrieved on Dec. 23, 2004.

Molesky et al. "Recovery Protocols for Shared memory Database Systems"; Association of Computing Machinery; 1995; pp. 11-22.

Agrawal, D, Krishnaswamy, V. "Using multiversioning data for non-interfering execution of write-only transactions", SIGMOD Conference 91, 98-107.

Ahuja, M., Browne, J., "Performance Evaluation of Two Concurrency control Protocols for distributed data bases with multi-versioned entities", IEEE 1988, 426-436.

Bayer, R., Heller H., Reiser, A., "Parallelism and Recovery in Database", Transactions on Database Systems, vol. 5, No. 2, pp. 139-156, Jun. 1980.

Bernstein, P. and Goodman, N., "Multiversion Concurrency Control—Theory and Algorithms", ACM Transactions and Database Systems, vol. 8, No. 4, pp. 465-483, Dec. 1983.

Berenson, et al., A critique of ANSI SQL Isolation Levels, SIGMOD, San Jose, California 1995.

Bober, P., Carey, M. "On Mixing Queries and Transactions via Multiversion Locking", ICDE Madison, Wisconsin, 1992: 535-545.

Bober, P., Carey, M., "Indexing for multiversion locking: alternatives an performance evaluation", IEEE Tranasactions on Knowledge and Data Engineering, vol. 9, No. 1, Jan.-Feb. 1997.

Chan, A. et al., "The Implementation of an Integrated Concurrency Control and Recovery Scheme", Proceedings of the Association for Computing Machinery SIGMOD International Conference on Management of Dale, Orlando, Florida, Jun. 1982.

Lornet, D., MLR: A Recovery Method for Multi-level systems, ACM SIGMOS 1992.

Kempster, T. et al., Diluting Acid, SIGMOD Record, vol. 28, No. 4, Dec. 1999.

Lamport, L., On Interprocess Communication. Part I: Basic Formalism and Part II: Algorithms, Distributed Computing 1 (2): 77-101, 1986.

Lomet, D., et al. "Access methods for multiversion data", D. Lomet, B. Salzberg, SIGMOD Conference 1989; 315-324.

Mohan, C., "Commit_LSN: A novel and simple method for reducing locking and latching in transaction processing systems", 16th VLDB Conference (Brisbane, Australia), Aug. 1990.

Mohan,C., Pirahesh, H., Lorie, R., "Efficient Flexible Methods for Transient Versioning of records to avoid locking by read-only transactions", ACM SIGMOD 1992.

Oracle 9i Database concepts, Chapter 22, Date Concurrency and Consistency, on-line documentation at http://doc.oracle.com, Jul. 2001.

Bober, P., Carey, M., "Multiversion Query Locking", P. Bober, M. Carey, Proceedings of the 18th VLDB Conference (Vancouver, British Columbia, Canada) 1992.

Reed, D., PhD Thesis, "Naming and Synchronization in a Decentralized Computer System", Technical Report MIT/LCS TR-205, Massachusetts Institute of Technology, pp. 1-181, Sep. 1978.

Robinson, J. et al., "Elimination of Lock Contention and Relational Databases Accessed by Read-Only Queries and On-Line Update Transactions", IBM Technical Disclosure Bulletin, pp. 180-185, Jun. 1988.

Stearns, Richard E. et al., "Distributed Database Concurrency Controls Using Before-Values", Proceedings of the Association for Computing Machinery SIGMOD International Conference on management of Data, Ann Arbor, Michigan, pp. 74-83. Apr. 1981.

"Times-Ten Team: In-Memory Data Management for Consumer Transactions The Times Then Approach", SIGMOD conference, Philadelphia, PA, pp. 528-529, 1999.

Weikum, G., A theoretical foundation of multi-level concurrency control, Proc. Of ACM PODS Conf., Mar. 1986.

Weikum G., Principles and realizations strategies of multilevel transaction management, ACM Transactions and Database Systems, vol. 16, No. 1, pp. 132-180, Mar. 1991.

* cited by examiner

METHOD AND APPARATUS FOR INCREASING TRANSACTION CONCURRENCY BY EARLY RELEASE OF LOCKS IN GROUPS

FIELD OF INVENTION

The invention relates to the field of data processing systems. More specifically, the invention relates to locking techniques used for database management systems. More particularly, the invention relates to controlling the locks acquired on various data records and release of locks in groups.

BACKGROUND

A database is a collection of related data items. To perform various tasks, users access data items stored in the database via transactions. These user accesses need to be controlled to ensure data consistency.

A database management system (DBMS) supports transactions to access the data items stored in the database. To get a consistent view of the data items, the transaction acquires locks on the data items before accessing them. The transaction may release these locks when it no longer needs access permissions to the data item. By default, all locks that the transaction owns are released when the transaction completes. Thus it can be inferred that every lock that the transaction acquires has an associated life-span. This life-span is the time elapsed between when the lock is acquired and when the lock is released. This lock life-span is commonly referred to as a lock duration. The lock duration is typically shorter than the life span of the lock acquiring transaction. A lock manager (LM) processes locking and unlocking requests by transactions. The LM should also support the ability to release locks in a given group before the transaction finishes.

Transactions have an additional property called isolation. Generally, DBMSs support serializable, cursor stable, read committed, dirty read, etc., isolation levels. For most non serializable isolation levels, locks may be released on data items before the transaction finishes. One such example is a read committed isolation level. According to the consistency semantics of this isolation level, the most recently committed value of the given data item should be read by the accessing transaction. One implication of this is that the transaction may request a lock on a data item, read the data item, and then release the lock on the data item, and this may be repeated as many times as desired, where each read of the same data item may potentially return a different value. Such a transaction may need to group locks and release the group locks in one call to the LM, instead of releasing all such locks individually.

Commercially available DBMSs support a few lock durations. Each duration has a distinct name and predefined semantics. For example, instant, short, medium and long lock durations are used in many commercially available DBMSs. The duration of a lock is not determined by the LM, but by the transaction that requests the lock. A transaction may, based on its isolation level, choose different durations for the same data item. If the transaction is executing under serializable isolation, then the lock durations are trivially from the time acquired to the end of the transaction. In this case, all locks for a transaction are released when the transaction execution is complete.

However, for weaker isolations (cursor stability, read-committed), lock durations play a very important role. Transactions may request release for some locks before transactions are complete. Such early release of locks is necessary to promote transaction concurrency. Reducing lock duration reduces access conflicts. For example, a transaction may request locks that are to be released early in the medium duration. When the transaction determines that access is no longer needed to any data item in that set, it may request the LM to release all medium duration locks.

However, there is currently no meaningful way to define and manage a potentially unlimited number of groups which a transaction may want to classify a given lock. Managing these groups with a few a priori meaningful lock durations will necessitate a separate queue manager that will need to note all classifications. This would be cumbersome and complicated. Providing only a few lock durations may not be suitable to effectively manipulate lock usage for complex non serializable transactions.

The present invention addresses this and other problems associated with the prior art.

SUMMARY OF THE INVENTION

Activity Duration Locking (ADL) provides an efficient simple solution to manage a potentially large number of concurrently active lock groups. The ADL scheme allows a transaction fine control over creation of lock groups and classification of locks into lock groups enabling faster releasing of locks in groups. The life time that the lock group is active defines a new lock duration. This allows a large number of lock durations to be defined with the creation of each new lock group, and any number of lock durations can be active for a given transaction. A very general concept of lock duration is supported without using any a priori semantics to individual lock durations and the duration of a lock group may be determined by the transaction as desired.

DETAILED DESCRIPTION

Figure 1:
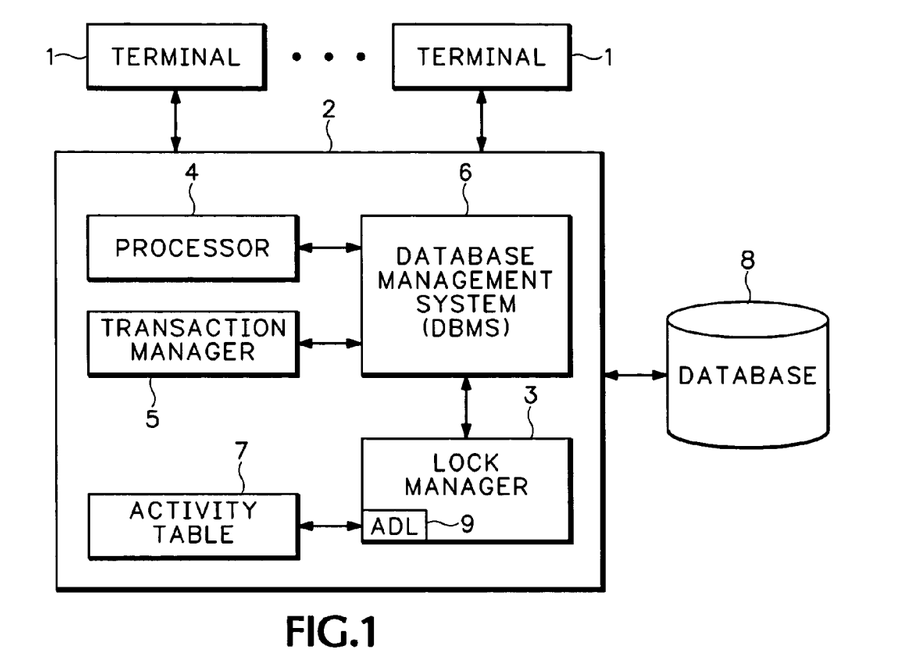
FIG. 1 is a block diagram of a Database Management System that uses an Activity Duration Locking (ADL) scheme.

FIG. 1 shows a database system that includes a database 8 and a processor 4 (Central Processing Unit (CPU) and memory) that stores and executes software for a Database Management System (DBMS) 6. A computing device 2 containing processor 4 in one example is a server. The processor 4 may be a single CPU or multiple CPUs that operate in the server 2. The database 8 is typically stored on a plurality of Direct Access Storage Devices (DASDs) although only one such device is illustrated in FIG. 1. The DASDs may be, for example, disk packs, and it will be understood by those skilled in the art that the database system includes the required DASD controllers and channels that establish the communication between the database 8 and the processor 4. In another example the database (8) may be stored inside the main memory (4) itself.

Terminals 1 can be any Input/Output (I/O) device that accepts requests from and returns results to users. For example, the terminals 1 may be Personal Computers (PCs) or applications that use the advertised application programmer interface (API). Transactions and queries are submitted from the terminals 1 and are processed concurrently by the DBMS 6.

A transaction manager 5 is a software module of the DBMS 6 that controls how different transactions are conducted in the database 8. A Lock Manager (LM) 3 is a software module of the DBMS 6 that helps the transactions in acquiring and releasing locks on data items in the database 8 in a controlled manner. The LM 3 makes sure that conflicting accesses to a given data item are not granted simultaneously. For example, if a simultaneous read and write access has been granted on a data item, then the reader of that data item may see an incomprehensible state of the data item. Thus some lock requests may not be granted to different transactions simultaneously, since there can be conflicts in the lock grant requests.

All transactions request that locks on data items be granted in desired lock modes. For example, the reader may request a lock in shared (S) mode and a writer may request the same lock in an exclusive (X) mode. If S and X are defined not to be compatible, then the LM 3 guarantees that no writer has access permission. In other words, no X lock exists on the data item if a S lock has already been obtained on that data item. Thus a reader can read a consistent state of the data item after S lock has been obtained on that data item.

Activity Duration Locking (ADL) module 9 allows the LM 3 to assign lock modes to groups of data associated with the same activities in a transaction. The ADL 9 uses an activity table 7 to keep track of the activities for different transactions.

Figure 2:
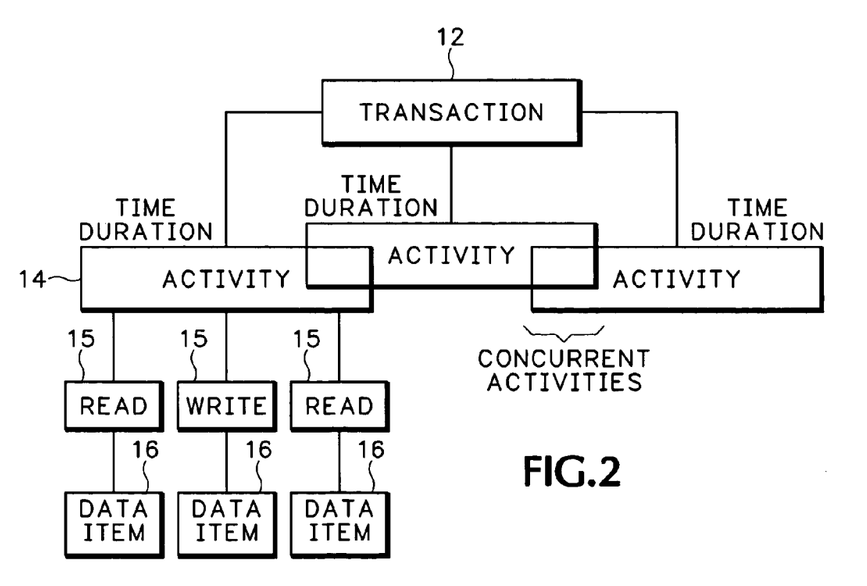
FIG. 2 is a logic diagram showing a duration of multiple activities for a transaction.

Referring to FIG. 2, a transaction 12 may be viewed at different levels of abstractions. At the lowest level, transaction 12 is a set of reads and writes 15 on data items 16 which are stored in the database 8 (FIG. 1). At the intermediate level, the transaction 12 can be viewed as a collection of activities 14. Each activity 14 is a set of closely related actions on a group of data items 16. That is, an activity 14 is a set of reads and writes 15, and in turn is a subset of all actions performed by the transaction 12. For example, compilation of a structured query language (SQL) statement is an activity. Any transaction 12, as a whole, is itself an activity.

Each activity 14 spans a finite period in time. Activities 14 for transaction 12 may overlap in time, that is, they may be concurrent. Each activity 14 accesses a finite set of data items 16, and every data item 16 accessed by the transaction 12 belongs to a finite set of activities 14. The transaction 12 locks data items 16 through different activities 14. A transaction 12 can have arbitrary many concurrent activities 14 and any activity 14 may lock an arbitrary number of data items 16. These locks are released when the activity 14 finishes.

Figure 3:
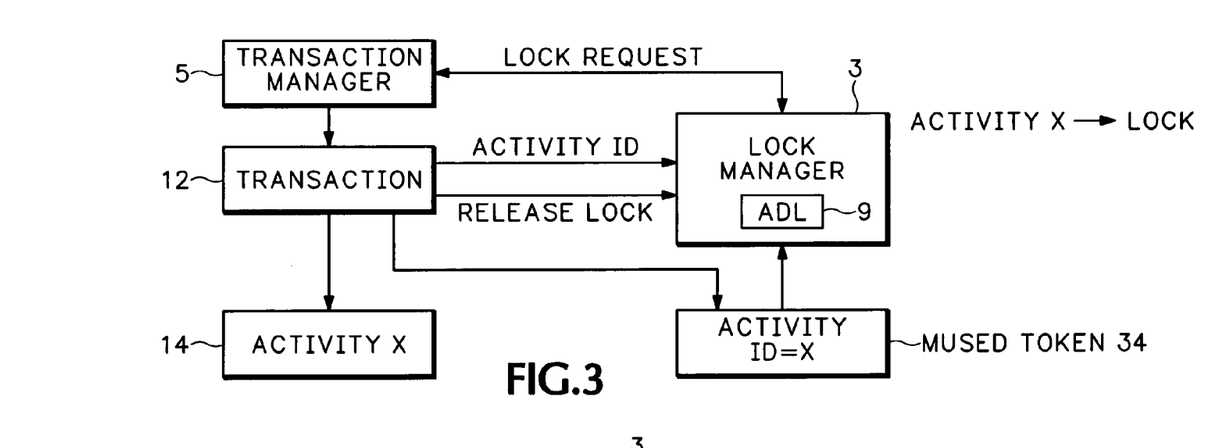
FIG. 3 is a block diagram showing how the multiple activities are identified.

Referring to FIG. 3, the ADL module 9 provides an efficient means of classifying locks into activities with minimum overhead and also efficiently releases all locks in an activity, when the activity is completed. Classification and grouping of activities is performed in the lock manager 30. Thus, the transaction manager 5 only needs to note the currently alive activity identifiers for the activities.

For example, when transaction 12 starts a new activity 14 (activity X), the transaction 12 chooses a unique and unused token 34 for uniquely identifying the activity 14. This token 34 is referred to as the ActivityID. The LM 3 may help the transaction 12 in determining the unique ActivityID. When the transaction manager 5 requests the LM 3 for a lock, the ActivityID 34 is sent to the LM 3 so the LM 3 can classify the lock under the activity.

When the activity 14 is complete, the transaction 12 asks the LM 3 to release locks associated with the activity 14 identified by the unique ActivityID. The LM 3 releases all locks for the given activity 14 together. The ActivityID 34 is then declared free to be used by any new activities for transaction 12. Thus all locks associated with activity 14 are of this "activity duration".

Arbitrarily many lock durations can be defined and maintained in a non-serializable transaction 12. The onus of defining lock durations can be moved from the LM 3 to the transaction manager 5. This provides additional flexibility in defining and managing any number of desired lock durations. The ADL 9 provides a simple and efficient implementation in which to define lock durations, enabling early releasing of locks for non serializable transactions.

Figure 4:
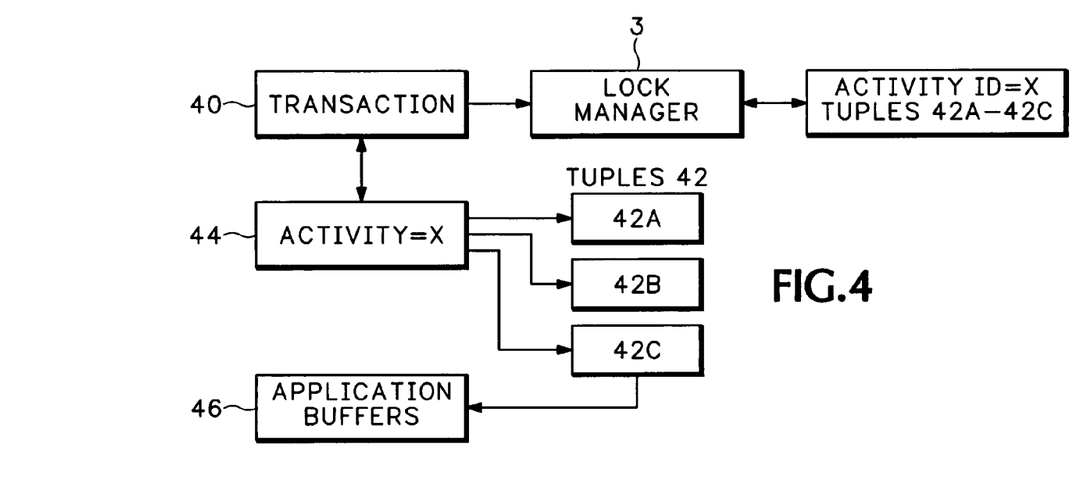
FIG. 4 is a block diagram showing how a group of tuples are associated with an activity in a prefetch operation.

FIG. 4 shows an example of how separating a transaction into activities helps efficiently complete a given task. Consider the notion of pre-fetching. A transaction 40 requests access to multiple tuples 42. These tuples 42 are retrieved from the database 8 (FIG. 1) one by one, or in bulk. For example, the tuples 42 may be retrieved in the context of a ODBC SQLFetch call made to an ODBC interface [ODBC SQL3.0].

In such an environment, the database application typically provides space for only one tuple into which the retrieved data can be copied. Thus the intermediate layer can retrieve each tuple one by one, copy the data into an application buffer, and return to the application.

Another choice is to retrieve the tuple IDs in bulk, and after the first fetch simply copy data from the current tupleID into the application buffer. This pre-fetching typically proves to be faster than retrieving each tuple one by one. For such a scheme, it becomes necessary to hold lock on each tuple in the pre-fetch group since modification to the pre-fetched tuples should be prohibited until data has been copied from the current tuple group. Again it is faster to unlock all tuples in a prefetch group in one operation rather than unlocking the tuples one by one. This need is ideally satisfied by the notion of activities.

Before prefetching the group of tuples 42, the transaction 40 starts an activity 44 and asks the lock manager 3 to associate the locks in the prefetch group 42A-42C with activity 44. After data from the last tuple 42C has been copied into the application buffers 46, the transaction 40 requests LM 3 to release all locks pertaining to the activity 44. This solution is much more efficient than maintaining a list of locks obtained in the given prefetch session in the transaction 40 and then finally unlocking these locks one by one.

Figure 5:
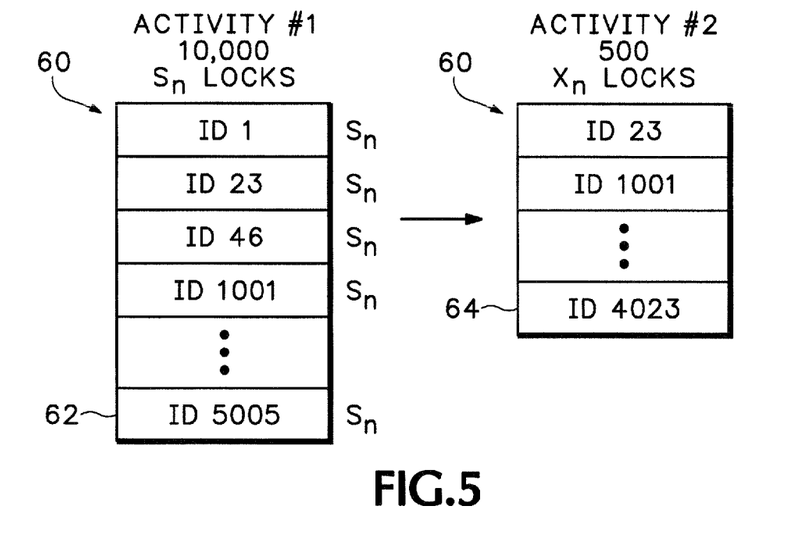
FIG. 5 is a block diagram showing how locks are assigned to different activities.

FIG. 5 shows another example of how locks are associated with activities. The following transaction is conducted in the DBMS.

Transaction
   Execute (Activity #1)
   Data>10 and Data<16
   and ParentID=4
   Execute (Activity #2)
     Set ParentID=ParentID+2,
     (confirm ParentID+2 exists, then change ParentID)
   End Activity #2
   End Activity #1

This transaction requests incrementing the ParentID for each data item having a ParentID of 4 and having a data value greater than 10 and less than 16. In one implementation of this transaction two steps are executed, in the first step all those tuples for which "data" value is between 10 and 16 are gathered, and in the second step this group is further qualified by selecting only those tuples that have ParentID=4. The first step is implemented as an activity (Activity #1) that stores the tuples 62 for all data items having a value between 10 and 16 in a buffer 60. The tuples 62 contain an identifier (ID) that points to associated data items. In this example, there may be ten thousand data items having values between 10 and 16. Under activity #1, a shared lock S is placed on the each one of the ten thousand tuples 62 satisfying Activity #1. A shared lock S means that certain other transactions, such as a read transaction, can access the same data items at the same time.

The next activity (Activity #2), under the same transaction, first finds all the tuples that have ParentID field set to 4. For all those tuples we then increment the ParentID field by 2. I.e. the second activity must first confirm that the ParentID is indeed 4, then Activity #2 increments the ParentID identified in the tuples by 2.

In this example, the tuples 64 identify the data items in buffer 60 that have a ParentID that can be incremented by two. An exclusive lock X is placed on the tuples 64 in buffer 60 identified under Activity #2. An exclusive lock X means that no other transactions can access the same data item at the same time. Thus, under activity #1 there are ten thousand S locks placed on the tuples 62 and under activity #2 there are only 500 X locks placed on the subset of tuples 64 (that had ParentID=4).

After the end of Activity #2, there are 9500 data items that no longer need S locks. Activity #1 ends after the completion of Activity #2. The end of Activity #1 automatically releases the S locks on the 9,500 data items that are not verified under Activity #2.

Figure 6:
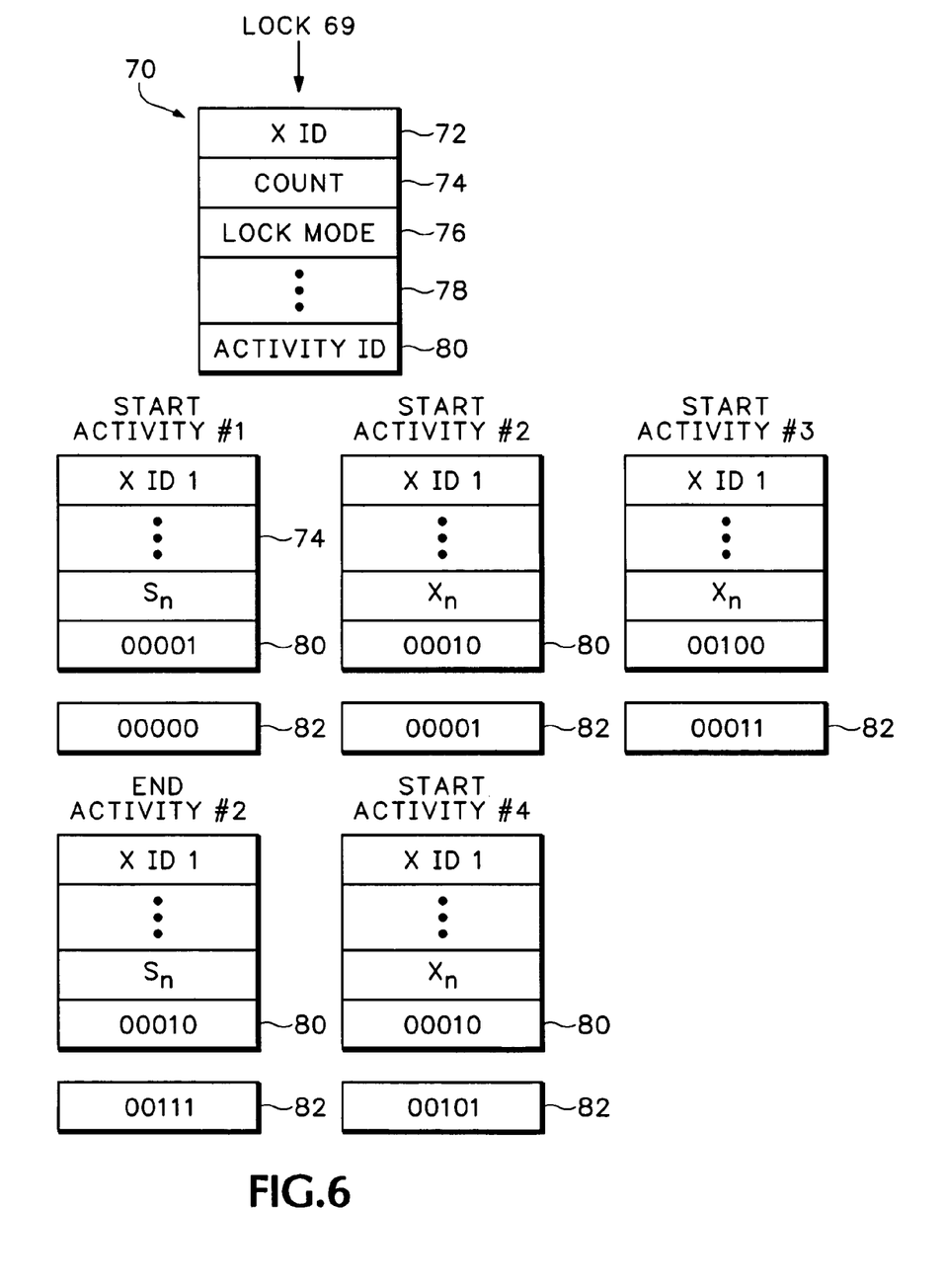
FIG. 6 shows how activity identifiers are assigned.

FIG. 6 shows a sample lock 69 that includes a transaction ID 72, a lock count 74, a lock mode 76, other lock parameters 78 and an activity identifier 80. An activity bit map 82 is located in the transaction manager 5 or the lock manager 3 (FIG. 1) to track the different activities for a given transaction. The activity Id 80 contains a unique bit map value that identifies the activity holding the lock 69. A first activity #1 starts for a given transaction XID1. Since the current binary value in the activity map 82 is 00000, the activity #1 is assigned the binary value ActivityID=00001. The first activity #1 may hold an S lock on associated data items. A second activity #2 is started and holds a X lock on associated data items. The second activity #2 is assigned the next available bit in the activity bit map 82 and accordingly is assigned the ActivityID=00010. The activity bit map 82 now has the binary value 00011. A third activity #3 holds an S lock on associated data items and is assigned the next available bit in the activity bit map 82 and accordingly is assigned the ActivityID=00100. The activity bit map 82 then has the value 00111.

If the second activity #2 ends, the activity map 82 is changed to the binary value 00101. The next new activity to generate a lock 69 is then assigned the binary value ActivityID=00010 made available by the termination of the second activity #2.

Figure 7:
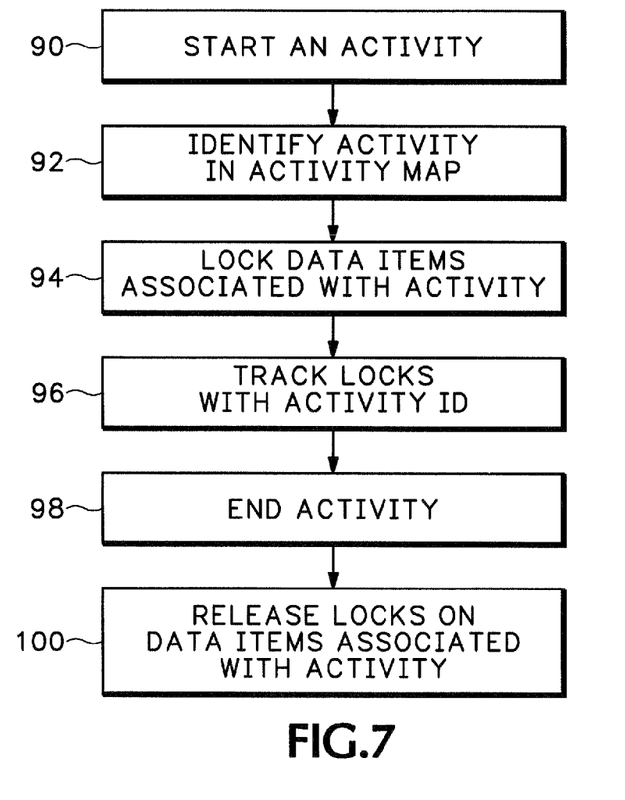
FIG. 7 is a flow diagram showing how locks are released for different activities.

FIG. 7 describes in general terms how the ADL 9 in FIG. 1 operates. An activity is started by the transaction manager in block 80. The activity is identified according to the activity bit map in block 82. The data items referenced by the activity are locked according to the lock manager in block 84. The locks for the activities are tracked by the lock manager in block 86. As soon as an activity ends in block 88, the locks for the group of data items associated with that activity are released by the lock manager in block 100.

Thus it can be seen that the notion of activities is very valuable in the implementation of various optimizations and efficiently conforming to semantics of various isolation levels in DBMS. The current invention provides transaction managed durations that are very flexible.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A database management system, comprising:
a processor configured to:
associate multiple different activities with a same transaction, each of the multiple different activities each consisting of a separate different associated subgroup of program instructions for the same transaction,
for each of the different subgroups of program instructions, initiate a different associated subgroup of multiple different read and/or write actions that access an associated group of multiple different data items;
use and assign, for each of the different activities, only one single separate lock duration for all of the multiple different data items associated with the different associated subgroup of program instructions;
maintain, for each of the different activities, multiple different locks on all of the multiple different data items associated with the activity, and then release all of the multiple different locks for all of the multiple different data items associated with the activity together only when all of the subgroup of program instructions associated with the activity are completed so that all of the multiple different locks on all of the multiple different data items associated with the activity have a same lock duration;
release all of the locks on a first one of the groups of the multiple different data items associated with a first one of the different activities of the same transaction while a second set of data items that include at least some of the first group of data items from the first activity, but that are associated with a second one of the different activities for the same transaction, remain locked for a second one of the separate lock durations associated with the second activity.

2. A database management system according to claim 1 wherein one of the activities includes a group of individual shared lock operations and the processor activates locks for each of the individual shared lock operations in the group and releases the locks only when the all of the individual shared lock operations in the group are completed.

3. A database management system according to claim 1 including a memory containing an activity bit map that tracks individual activities for the transaction, the processor assigning activity identifiers to the activities according to the activity bit map.

4. A database management system according to claim 1 wherein, for each of the different activities, the processor releases all of the multiple different locks associated with the activity in one operation only when the subgroup of program instructions associated with the activity is completed.

5. A method for locking data items in a database management system, comprising:

associating multiple different activities with a same transaction, each of the multiple different activities each consisting of a different associated subgroup of program instructions for the same transaction and each different subgroup of program instructions initiating a different associated subgroup of multiple different read and/or write actions accessing an associated group of multiple different data items;

associating and using, for each of the different activities, only a single separate individual lock duration for each different subgroup of program instructions and the accessed multiple different data items associated with the same activities in the same transaction;

maintaining, for each of the different activities, multiple different locks on all of the multiple different data items for each different subgroup of program instructions associated with the same activities; and releasing all of the multiple different locks for all of the multiple different data items associated with the same activities together only when the entire subgroup of program instructions associated with the same activities are all completed so that all of the multiple different locks on all of the multiple different data items associated with the activity have a same lock duration; and releasing all of the locks on a first one of the groups of the multiple different data items associated with a first one of the different activities of the same transaction while a second set of data items that include at least some of the first group of data items from the first activity, but that are associated with a second one of the different activities for the same transaction, remain locked for a second one of the separate lock durations associated with the second activity.

6. A method according to claim 5 including:

maintaining an activity bit map that tracks individual activities for the transaction; and assigning activity identifiers to the activities according to the activity bit map.

7. A method according to claim 5 including associating the activities with lock modes and releasing the lock modes on data items when the associated activities are finished.

8. The method according to claim 5 including:

assigning a same unique activity identifier to multiple different arbitrary database access instructions that constitute one of the different activities in the transaction, the database access instructions performing one or more operations on multiple different data items in a database and the activity identifier assigned to and associated with the database access instructions independently of any relationship that may exist between the multiple different data items in the database accessed by the database access instructions;

assigning multiple locks to the multiple data items corresponding with the operations performed on the multiple data items pursuant to the database access instructions; and preventing other transactions and other associated activities from accessing the multiple different data items until all of the operations are completed for all of the database access instructions assigned to the activity identifier.

9. Computer readable media containing instructions that when executed by a computer, comprise:

assigning activity identifiers to different individual subgroups of database access instructions within a same transaction that perform multiple different operations on multiple different data items in a database, the activity identifiers assignable to the database access instructions independently of any relationship that may exist between the multiple data items in the database accessed by the database access instructions;

assigning multiple locks to the multiple different data items corresponding with the operations performed on the multiple data items by the different subgroups of database access instructions;

assigning only one single separate lock duration for all of the multiple different data items associated with a same subgroup of database access instructions;

for each of the different subgroups of database access instructions, assigning the same one of the activity identifiers to the locks that are associated with the subgroup of database access instructions;

releasing, for each of the assigned activity identifiers, all of the multiple locks on all of the multiple different data items assigned to the assigned activity identifier at the same time when all of the multiple operations are completed for the subgroup of database access instructions assigned to the assigned activity identifier, and wherein the releasing of all of the multiple locks is in response to a single request via the assigned activity identifier; and, releasing all of the locks on a first one of the subgroups of the multiple different data items associated with a first one of the activity identifiers of the same transaction while a second set of data items that include at least some of the first group of data items associated with the first one of the activity identifiers, but that are associated with a second one of the activity identifiers for the same transaction, remain locked for a second separate lock duration associated with the second activity identifier.

10. The computer readable media according to claim 9 including instructions that when executed assign the activity identifiers to an arbitrary group of related database access instructions performing operations on an arbitrarily related group of data items.

11. The computer readable media according to claim 9 including instructions that when executed assign common transaction identifiers to different related groups of database access instructions each assigned different activity identifiers and coordinate when the related groups of database access instructions are allowed to perform operations on the data items.

12. The computer readable media according to claim 9 including instructions that when executed assign a first transaction identifier to a group of individual shared operations, assign locks to the data items associated with the shared operations, and hold the locks until all of the individual shared operations in the group have been completed.

* * * * *

UNITED STATES PATENT AND TRADEMARK OFFICE
CERTIFICATE OF CORRECTION

PATENT NO. : 7,555,481 B1
APPLICATION NO. : 10/696416
DATED : June 30, 2009
INVENTOR(S) : Sanjay Verma et al.

It is certified that error appears in the above-identified patent and that said Letters Patent is hereby corrected as shown below:

On the Title Page on page 2, Item (56) under "Other Publications", line 1, delete "C.et" and insert -- C. et --, therefor.

On the Title Page on page 2, Item (56) under "Other Publications", line 17, delete "www.cs.wisc.edu/{cs764-1/oracle.locking.html." and insert -- www.cs.wisc.edu/cs764-1/oracle.locking.html. --, therefor.

On the Title Page on page 2, Item (56) under "Other Publications", line 9, delete "Tranasactions" and insert -- Transactions --, therefor.

On the Title Page on page 2, Item (56) under "Other Publications", line 14, delete "Dale," and insert -- Data, --, therefor.

On the Title Page on page 2, Item (56) under "Other Publications", line 15, delete "Lornet," and insert -- Lomet, --, therefor.

On the Title Page on page 2, Item (56) under "Other Publications", line 27, delete "Mohan,C.," and insert -- Mohan, C., --, therefor.

In column 8, line 36, in claim 9, delete "and," and insert -- and --, therefor.

Signed and Sealed this

Twenty-ninth Day of June, 2010

David J. Kappos
*Director of the United States Patent and Trademark Office*